United States Patent [19]

Aasen

[11] 4,279,095
[45] Jul. 21, 1981

[54] FLEA VACUUM SYSTEM

[76] Inventor: Helen C. Aasen, P.O. Box 1561, Long Beach, Calif. 90801

[21] Appl. No.: 109,036

[22] Filed: Jan. 2, 1980

[51] Int. Cl.³ .............................................. A01M 1/06
[52] U.S. Cl. ....................................... 43/139; 15/397; 15/402; 15/352
[58] Field of Search .............. 43/139; 119/84; 15/344, 15/397, 402, 352

[56] References Cited

U.S. PATENT DOCUMENTS

| | | | |
|---|---|---|---|
| 2,017,780 | 10/1935 | Walters | 119/84 X |
| 3,214,861 | 11/1965 | Arther | 43/139 |
| 3,477,087 | 11/1969 | Robinson | 15/344 |
| 3,668,736 | 6/1972 | Loscalzo | 15/402 |
| 3,750,327 | 8/1973 | Thybault | 43/139 |
| 4,074,458 | 2/1978 | Catlett | 43/139 |

FOREIGN PATENT DOCUMENTS 2240851  3/1973  Fed. Rep. of Germany .............. 15/397

Primary Examiner—Gary L. Smith
Assistant Examiner—Robert P. Olszewski
Attorney, Agent, or Firm—Fulwider, Patton, Rieber, Lee & Utecht

[57] ABSTRACT

An attachment is provided for a vacuum cleaner hose and is equipped with a canister having a handle and a nozzle having a pointed suction head. Within the nozzle a vacuum plenum is bounded by a partition having an array of firm pliable fingers about its perimeter and a plurality of flexible annular tubes within the perimeter thereof and in communication with the plenum. An exhaust pipe extends rearwardly from the attachment and is connected to a household vacuum cleaner hose. The nozzle is worked across the coat of a house pet, such as a dog or cat, to rid the animal of fleas. Within the canister there is a disposable tubular bag which contains a chemical substance that kills fleas and flea eggs as they are dislodged and carried by suction from the animals coat.

7 Claims, 5 Drawing Figures

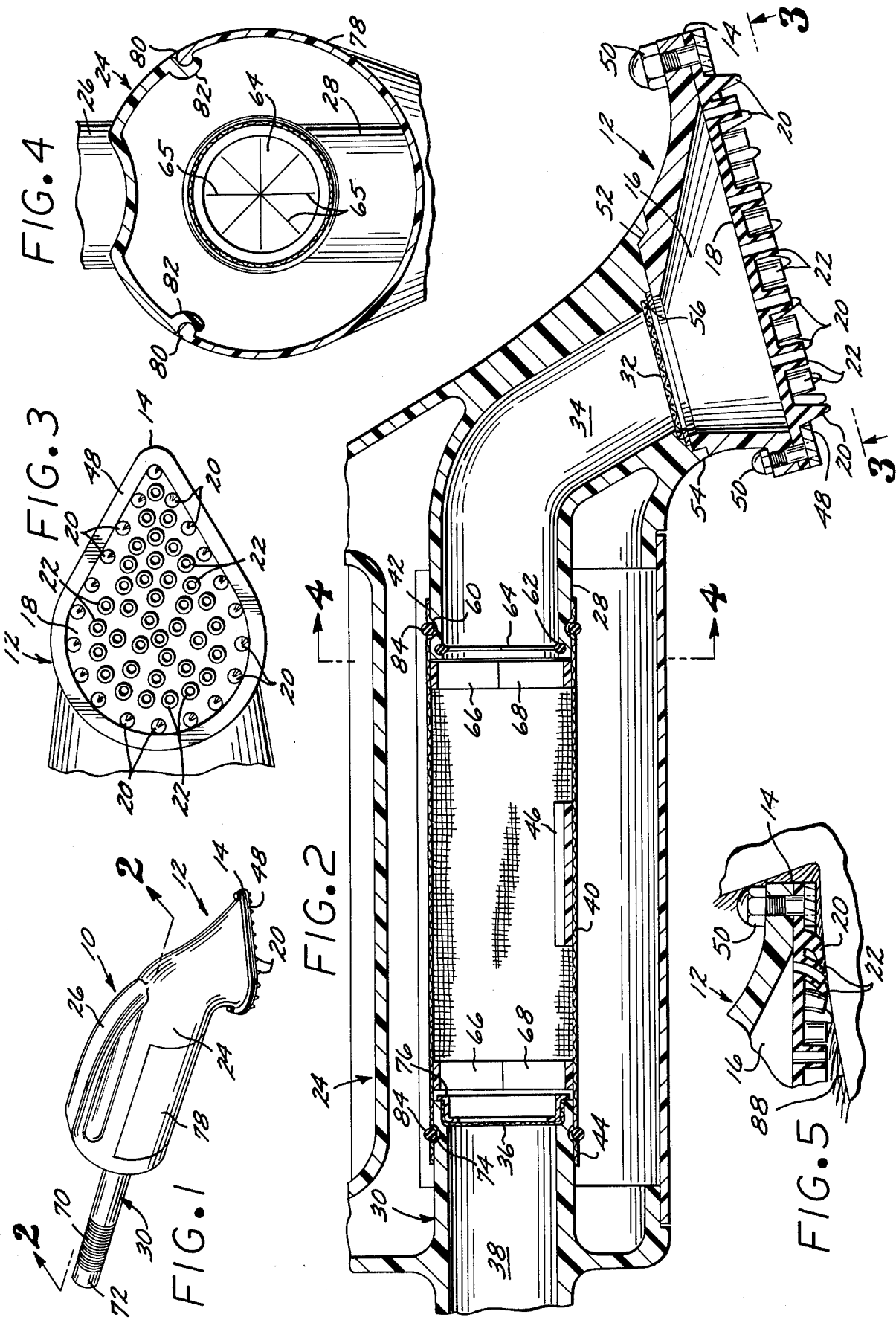

FLEA VACUUM SYSTEM

BACKGROUND OF THE INVENTION

1. Field of the Invention

The present invention relates to methods and devices for ridding house pets of fleas and flea eggs.

2. DESCRIPTION OF THE PRIOR ART

House pets have increasingly gained favor as family companions in domestic households in recent years, but such pets have consistently been plagued with fleas. The genus of "fleas" includes numerous, small, wingless, blood sucking insects of the order Siphonaptera, which are parasitic upon mammals and birds, and which are noted for their powers of leaping. Fleas find a very favorable environment in the furry coats of household pets, which are frequently kept indoors and are not exposed to great temperature extremes. Fleas lay their eggs and raise their larva amidst the protection of the fur coat of a housepet, typically a dog or a cat. Fleas survive by inflicting painful bites upon their host animal to penetrate the animal's skin to gain nourishment from the blood of the animal. While house pets themselves seek to abate the discomfort and pain which fleas inflict upon them, their only recourse in this regard is to scratch or lick at an afflicted area on their bodies. This is almost entirely ineffective in ridding the animals of these parasitic pests, and at best serves only to drive the fleas from an area of particular irration on the host animals body.

Pet owners have long sought to ease their pets discomfort from fleas by various means of flea eradication. Bathing the animals with soap having insecticidal properties is one means commonly used to kill the fleas on a pets body and to ease the animals discomfort. However, the soap employed is very irrating to the animals eyes, nose and mouth. Consequently, it is very difficult to bathe this area of the animals body. Also, fleas tend to migrate to the animals head and thereby escape extermination during the bathing process. Furthermore, many pets are afraid of the partial immersion in water which is necessary in the bathing procedure. As a consequence, these pets become excited and must be physically restrained and held in the bathing area. This requires considerable effort on the part of the pet owner and tends to make the process of flea extermination by bathing both arduous and infrequent. Moreover, even after the animal has been bathed other fleas hiding in the vicinity, such as in carpeting, quickly jump on the animal as it passes following a bath so that the pet's comfort from bathing is relatively brief.

Another method of treatment of housepets for fleas involves the use of flea powders and flea collars. Both the powders and collars employ harsh chemical substances which exhibit insecticidal qualities when fleas are exposed thereto. However, flea powders must be rubbed into an animals coat to perform their intended function and frequently lead to dusty spots on the pet owners clothing and on the carpeting in the domicile. Flea collars are impregnated with chemical substances which emit a vapor that tends to retard the propogation of fleas. However, the chemicals employed also tend to cause considerable irritation in the neck area of the house pet about which they are placed.

SUMMARY OF THE INVENTION

The present invention is a method and device for ridding house pets of fleas using a vacuum suction system. The device employed is a vacuum cleaner attachment which has a canister with an elongated handle and a nozzle at one end. The nozzle has a pointed suction head which defines a vacuum plenum chamber behind a transverse partition. The partition has an array of firm, pliable, stubby fingers, typically constructed of rubber, which are arranged about the perimeter of the partition on the suction head of the nozzle. A plurality of more flexible annular tubes are located within the confines of the partition inwardly from the encircling ring of fingers. Within the canister there is a removable, disposable tubular bag with sealable ends and with a chemical substance therein for killing fleas and flea eggs. At the end of the canister opposite the nozzle there is an exhaust pipe which is resilient enough to fit over the end connector of a conventional vacuum cleaner hose.

In the use of the device, the exhaust pipe is connected to the vacuum cleaner hose which leads from a vacuum impeller driven by an electric motor, preferably located as far from the canister of the invention as possible. The noise of the motor and impeller tends to make most house pets uneasy, so that by utilizing the vacuum attachment remote from the vacuum cleaner motor, an owner is able to minimize distress to the pet.

The canister is held by a handle integrally formed therewith and the owner manipulates the nozzle, working it across the coat of the pet following the body contour thereof. Because the nozzle has a pointed suction head, the owner is able to move the point of the suction head into creases in the body contour of the pet, such as behind ears and into the folds of skin at the pets shoulders and haunches.

Because the vacuum suction is applied through flexible annular tubes in the suction head, suction directly against the animals skin is unlikely. Nevertheless, the firm, pliable fingers about the perimeter of the suction head ruffle the fur of the animals coat and tend to agitate fleas hiding therein and to expose flea eggs. The vacuum suction through the flexible tubes is thereby able to draw the fleas and flea eggs into the nozzle without discomfort or agitation to the pet. An owner is able to quickly and frequently relieve the pets distress due to fleas with a minimum of effort and with the gentlest possible treatment of the animal.

The invention may be described with greater clarity and particularly by reference to the accompanying drawings.

DESCRIPTION OF THE DRAWINGS

FIG. 1 is a perspective view of the vacuum cleaner attachment device of the invention.

FIG. 2 is a sectional elevational view taken along the lines 2—2 of FIG. 1.

FIG. 3 is a plan view of the face of the nozzle of the suction head taken along the lines 3—3 of FIG. 2.

FIG. 4 is a cross sectional view of the invention taken along the lines 4—4 of FIG. 2.

FIG. 5 is a sectional detail illustrating the operation of the invention.

DESCRIPTION OF THE EMBODIMENT AND METHOD

FIG. 1 illustrates a vacuum cleaner attachment 10 for ridding house pets of fleas. The vacuum cleaner attachment 10 is formed of a generally cylindrical shaped canister 24 having an integrally formed elongated handle 26 along its top. A cylindrical exhaust pipe 30 extends from the rear of the canister 24, which at its opposite end has a nozzle 12 that defines a suction head pointed at the nose 14.

The nozzle 12 is hollow with interior sloping frustoconical walls that define a vacuum plenum chamber 16, as illustrated in FIG. 2. A transverse rubber partition 18 extends across the mouth of the vacuum plenum chamber 16 and includes an array of firm but pliable pointed fingers 20 that are arranged about the perimeter of the partition 18 in a generally arrowhead shaped pattern as illustrated in FIG. 3. A plurality of flexible annular tubes 22 depend from the partition 18 within the perimeter thereof and are directed outwardly therefrom, as are the fingers 20. The annular tubes 22 are softer and more pliant than the surrounding fingers 20 because they are hollow. The tubes 22 thereby bend more readily than do the stubby fingers 20.

As depicted in FIG. 3, the nozzle 12 has a suction head which has an outer configuration of a circular arc which on one side includes an elongated, pointed nose 14. The transverse rubber partition 18, the peripheral, knub-like fingers 20 and the interiorally located flexible annular tubes 22 are all integrally formed of a single, rubber structure. The outer border of the partition 18 is secured to the conical shaped plastic portion of the nozzle 12 by means of an edge retaining rim 48 that extends about the perimeter thereof. The rim 48 secures the edges of the partition 18 in position in contact with outwardly extending flanges of the plastic portion of the nozzle 12 by means of screw fasteners 50 spaced about the perimeter of the base of the nozzle 12.

The nozzle 12 is connected to the canister 24 which has an inlet neck 28 that extends downstream interiorally within the canister 24, as illustrated in FIG. 2. The neck 28 is connected to the nozzle 12, in a friction fit. The outer surface contour of the nozzle 12 is reduced at 52 opposite the rubber partition 18 to fit telescopically into the inlet neck 28 of the canister 24. The inlet neck 28 includes an annular lip 54 that captures the reduced diameter portion 52 of the nozzle 12.

Within the surrounding lip 54, a removable, diskshaped coarse filter 32 is seated upon an interior ledge in the inlet neck 28. The coarse filter 32 is held in position transversely across an inlet passageway 34 by a C-shaped radially outwardly biased retaining spring 56 that is compressed to seat within a corresponding annular recess in the inlet neck 28 to hold the coarse filter in position.

The coarse filter 32 is a coarse wire screen which may be formed of 16 gauge wire and have openings ⅛ inch square therein. The purpose of the coarse screen filter is to allow fleas and flea eggs to be sucked into the canister 24, but to trap animal hair that is also likely to be drawn by the vacuum from the coat of the house pet.

A plastic exhaust pipe 30 extends axially from the rear of the canister 24, both interiorally therein and also externally therefrom as illustrated in FIGS. 1 and 2. A transverse, porous, fine filter 36 is positioned upstream of an exhaust passageway 38 defined within the exhaust pipe 30. A removable, disposable, porous tubular bag 40 with sealable ends 42 and 44 is positioned between the inlet passageway 34 and the exhaust passageway 38, and contains a chemical pad 46 which is impregnated with an insecticidal substance for killing fleas and flea eggs.

The canister 24 is of an elongated, generally tubular configuration with an integrally formed handle 26 spaced from the upper surface of the tubular portion of the canister 24 in longitudinal alignment therewith. An individual is able to grasp the handle 26 and there is room in the opening defined between the handle 26 and the tubular portion of the canister 24 to allow a person's fingers to be inserted therein.

The inlet neck 28 of the canister 28 is constructed as an internal pipe that is curved in an angle of about 110° from the nozzle 12 to extend in axial alignment along the center of the cylindrical portion of the canister 24. At the downstream extremity of the inlet neck 28 there is an externally defined circular, annular groove 60 formed in the outer surface of the neck 28. Further downstream there is an internal groove 62 defined in the neck 28 at its extremity.

The groove 62 accomodates a flapper valve 64, which is a thin rubber disk divided into sectors by slits 65 extending nearly across the surface thereof at angles relative to each other. The slits form a generally starshaped pattern, as illustrated in FIG. 4. When vacuum is applied to the nozzle 12, the inrush of air into the canister 24 will cause the sectors of the flapper valve 64 to bend away from the center of the inlet passageway 34 in the downstream direction in the canister 24. This opens the inlet passageway 34 and allows fleas and flea eggs to be drawn through the opening defined between the sector shaped sections in the flapper valve 64. Conversely, when vacuum is no longer applied, the flexible sectors of the flapper valve 64 return to a position of generally coplanar alignment, as depicted in FIG. 2, so that the fleas entrapped behind the flapper valve 64 in the tubular bag 40 cannot return back through the inlet passageway 34 to the house pet from which they have been drawn once the vacuum is turned off. Rather, they are blocked from moving downstream. While vacuum is applied, of course, the flapper valve 64 is open but the vacuum force prevents the fleas from traveling upstream, if any remain alive within the tubular bag 40.

The tubular bag 40 is preferably constructed of paper, or some other porous material within which fleas and flea eggs are confined, but through which air may pass to some extent so as to equalize pressure within the canister 24. At each end, the tubular bag 40 is equipped with mating transverse velcro strips 66 and 68 mounted diametrically opposite each other, and each extending roughly in a semicircle around the interior of the tubular bag 40 at the longitudinal extremities thereof. The velcro surfaces 66 include a multiplicity of tiny hooks while the strips 68 provide a multiplicity of pile loops. When the mating strips 66 and 68 are pressed together at either the upstream end 42 or the downstream end 44 of the bag 40, the hooks of the strip 66 become embedded and engaged with the loops in the pipe of the strip 68, thereby closing the end of the disposable tubular bag 40. The strips 66 and 68 are not moved into sealing engagement with each other until the disposable bag 40 is to be removed from the canister 24.

The outlet pipe 30 of the canister 24 extends upstream inwardly into the enclosure of the canister 24, and also externally to the rear thereof, as depicted in FIG. 1. The external portion of the outlet pipe 30 is constructed with a flexible elbow 70 that is formed by accordion type corrugated folds in the plastic. The downstream extremity 72 of the exhaust pipe 30 may be inserted telescopically about the mouth of a metal or plastic end connector for a flexible vacuum cleaner hose. The flexible elbow area 70 allows the exhaust pipe 30 to form an air tight seal over the end connector of a vacuum cleaner hose.

The exhaust pipe 30 also extends inwardly upstream within the canister 24 and has a transverse, annular, circular groove 74 defined in its outer surface. At the upstream end of the exhaust pipe 30 there is a hat-shaped fine filter 36 which includes a disk-shaped portion that extends across the exhaust passageway 38, but which also includes an outwardly flared lip 76 that resides in abutment against the upstream end of the exhaust pipe 30. The fine filter 36 is disposed in the upstream end of the passageway 38 in a frictionally engaging fashion, so that it is held in fixed disposition therein. The fine filter 36 may be formed of a wire screen of 16 gauge wire formed with ⅛ inch square openings, but across the upstream side of which a porous, ⅛ inch thick, cotton gauze pad has been disposed. The fine filter 36 prevents fleas from being drawn downstream beyond the downstream end of the disposable tubular bag 40.

The canister 24 includes an arcuate panel 78 disposed about its underside and which terminates along both longitudinal edges in enlarged elongated beads 80, as illustrated in FIG. 4. The beads 80 seat in inwardly recessed cup-shaped longitudinally extending lips 82 defined in the body of the canister 24. The panel 78 may be removed by prying one of the beads 80 free from a snap fitted seated engagement with a corresponding longitudinally extending lip 82. With one bead 80 removed from seating engagement, the other bead will readily come free of engagement with its corresponding lip 82. This provides access to the tubular disposable bag 40 from the underside of the canister 24.

Both the upstream and the downstream ends of the tubular bag 40 are held in position in the grooves 60 and 74 of the inlet neck 28 and the exhaust pipe 30 respectively by encircling O-rings 84. The O-rings 84 may be rolled longitudinally along the inlet neck 28 and exhaust pipe 30 off of the ends of the disposable bag 40 to allow one disposable bag to be removed and replaced with another. As the disposable bag 40 is removed, the mating velcro strips 66 and 68 are pressed together from their normal semicircular configuration to become enmeshed in each other and pursed together in a flat sealed interface so that any fleas surviving within the bag 40 cannot escape therefrom. The bag 40 can then be removed and replaced as desired.

In the use of the invention, an individual first secures the vacuum attachment 10 to the end connector of a vacuum cleaner hose by inserting that end connector into the downstream end extremity 72 of the exhaust pipe 30. With the tubular bag 40 in position as illustrated in FIG. 2, and with the access panel 78 likewise in position as depicted in FIGS. 2 and 4, an individual turns on power to the vacuum cleaner motor so that a suction is applied through the nozzle 12. The person then holds the house pet in a comfortable position and proceeds to rid the pet of fleas by working the nozzle 12 across the coat of the pet, following the body contour thereof. As the nozzle 12 moves, the pliability of the fingers 20 extending outwardly from the partition 18 tends to dislodge fleas and flea eggs from the coat of the animal without causing discomfort. The fleas tend to jump to a new location upon the animals body. However, the flexible annular tubes 22 concentrate a vacuum suction upon the area of the animals body encompassed by the perimeter of the nozzle 12. Fleas jumping within this area are quickly sucked into the vacuum plenum chamber 16, drawn through the flapper valve 64, which is open when the vacuum is applied to the nozzle 12, and into the disposable tubular bag 40. Within the bag 40, the vacuum produced tends to accelerate the rate at which insecticidal vapors are circulated within the bag 40 from the chemically impregnated pad 46. The fleas are thereby rapidly killed and expire leaving their remains with the disposable tubular bag 40. Flea eggs are likewise destroyed. Many choices of insecticidal substances for impregnating the pad 46 are available, including 2-(1-methylethoxy) phenol methylcarbamate, 2, 2-dichlorovinyl dimethyl phosphate and petroleum distillates.

As illustrated in FIG. 5, the nozzle 12 can be worked across the coat 88 of the pet's body and the point 14 of the suction head of the nozzle 12 can be moved easily into creases in the body contour of the pet. The removal of fleas from the pet is performed in a manner which is quite comfortable to the animal and which does not subject the pet to discomfort or agitation. The pliant fingers 20 and the annular tubes 22 bend to follow the body contour of the animal to maximize the dislodgement and evacuation of fleas therefrom. Moreover, because the fingers 20 and annular tubes 22 are so soft, the skin of the animal is not irritated nor does the nozzle 12 subject the pet to discomfort. By using the vacuum cleaner attachment 10 at a location remote from the vacuum motor, the owner is able to calm the pet since the intense whine of the motor occurs at some distance from the animal.

It should be understood that numerous modifications and variations of the practice of the invention and the embodiment employed in connection therewith are possible without departing from the scope of the invention. Accordingly, the scope of the invention is not limited to the specific embodiment of the device depicted nor to the precise implementation thereof described. Rather, the scope of the invention is defined in the claims appended hereto.

I claim:

1. A vacuum cleaner attachment for ridding house pets of fleas comprising:
    a nozzle having a pointed suction head defining a plenum extending from a transverse partition to an inlet passageway, an array of firm, pliable fingers about the perimeter of said transverse partition and a plurality of flexible, annular tubes within said perimeter of said partition and in communication with said plenum,
    a hollow collection canister having an integrally formed handle, an inlet neck connected to said nozzle at said inlet passageway, a displaceable access panel, and an exhaust pipe defining an exhaust passageway connectable to a vacuum cleaner hose,
    a removable transverse, coarse filter positioned across said inlet passageway,
    a transverse porous, fine filter positioned upstream of said exhaust passageway, and
    a removable, disposable tubular bag with sealable ends positioned within said canister between said inlet passageway and said exhaust passageway, and connected to said inlet neck at one end and said exhaust pipe at the other end.

2. A vacuum cleaner attachment according to claim 1 further characterized in that said tubular bag contains an insecticidal substance therein for killing fleas and flea eggs.

3. A vacuum cleaner attachment according to claim 2 further characterized in that the ends of said tubular bag are connected to said inlet neck and to said exhaust pipe by means of rubber O-rings.

4. A vacuum cleaner attachment according to claim 3 further characterized in that mating velcro surfaces are defined on the inner surfaces at the ends of said tubular bag, whereby said bag is sealable at both ends as it is removed from said canister.

5. A vacuum cleaner attachment according to claim 1 further characterized in that said annular tubes are softer and more pliant than said fingers.

6. A vacuum cleaner attachment according to claim 1 wherein said nozzle is removably coupled to said inlet neck and said coarse filter is located therebetween.

7. A vacuum cleaner attachment according to claim 1 further characterized in that said inlet neck is equipped with a flapper valve.

* * * * *